(12) United States Patent
Meiler et al.

(10) Patent No.: US 12,252,348 B2
(45) Date of Patent: Mar. 18, 2025

(54) SEPARATION DEVICE FOR SUPPLYING AND SEPARATING WORKPIECES AND LOADING SYSTEM WITH A SEPARATION DEVICE AND A SUPPLY DEVICE

(71) Applicant: OERLIKON SURFACE SOLUTIONS AG, Pfäffikon (CH)

(72) Inventors: Rudolf Meiler, Schiers (CH); Sebastian Nahen, Grabs (CH)

(73) Assignee: OERLIKON SURFACE SOLUTIONS AG, Pfäffikon (CH)

( * ) Notice: Subject to any disclaimer, the term of this patent is extended or adjusted under 35 U.S.C. 154(b) by 0 days.

(21) Appl. No.: 18/010,918

(22) PCT Filed: Jun. 24, 2021

(86) PCT No.: PCT/EP2021/067354
§ 371 (c)(1),
(2) Date: Dec. 16, 2022

(87) PCT Pub. No.: WO2021/260114
PCT Pub. Date: Dec. 30, 2021

(65) Prior Publication Data
US 2023/0234785 A1  Jul. 27, 2023

(30) Foreign Application Priority Data
Jun. 26, 2020 (DE) .................... 10 2020 116 888.8

(51) Int. Cl.
*B65G 47/14* (2006.01)
*B65G 29/00* (2006.01)
*B65G 47/24* (2006.01)

(52) U.S. Cl.
CPC ......... *B65G 29/00* (2013.01); *B65G 47/1407* (2013.01); *B65G 2201/0214* (2013.01)

(58) Field of Classification Search
CPC .... B65G 29/00; B65G 47/14; B65G 47/1407; B65G 47/24
(Continued)

(56) References Cited

U.S. PATENT DOCUMENTS 3,281,012 A    10/1966  Martell
3,722,740 A *  3/1973   List .................... B65G 47/1428
                                                    221/265
(Continued)

FOREIGN PATENT DOCUMENTS

DE    19511948 A1    2/1996
DE    10027008 A1   12/2001
(Continued)

OTHER PUBLICATIONS

Search Report for International Patent Application No. PCT/EP2021/067354, mailed Oct. 22, 2021.

*Primary Examiner* — Douglas A Hess
(74) *Attorney, Agent, or Firm* — PEARL COHEN ZEDEK LATZER BARATZ LLP

(57) ABSTRACT

A separation device for supplying and separating workpieces has a workpiece store, a first separation disc having first separation chambers, and a supply disc having workpiece guides, wherein the first separation disc is arranged such that it can be adjusted between a receiving position and a supply position relative to the supply disc, wherein in the supply position the first separation chambers are arranged flush with the workpiece guides, and wherein the first separation chambers are designed to supply workpieces arranged in the first separation chambers to the respective workpiece guides.

14 Claims, 11 Drawing Sheets

(58) Field of Classification Search
USPC .................................. 198/382, 392, 397.01
See application file for complete search history.

(56) References Cited

U.S. PATENT DOCUMENTS

| | | | | |
|---|---|---|---|---|
| 5,086,945 | A * | 2/1992 | Corella | B65B 5/103 221/265 |
| 5,826,696 | A * | 10/1998 | Rupp | B65G 47/1457 198/396 |
| 7,392,640 | B2 * | 7/2008 | Vasquali | B65B 5/103 53/247 |
| 7,950,517 | B2 * | 5/2011 | Marti Sala | B65G 47/1457 198/396 |
| 8,037,992 | B2 * | 10/2011 | Ackley, Jr. | B65G 47/24 198/383 |
| 8,925,708 | B2 * | 1/2015 | Cieslikowski | A24D 3/0216 198/450 |
| 9,238,149 | B2 * | 1/2016 | Arendash | A61N 5/02 |
| 9,302,296 | B2 * | 4/2016 | Ng | B07C 5/36 |
| 10,071,866 | B2 * | 9/2018 | Fallon | B65G 47/8876 |
| 10,377,577 | B2 * | 8/2019 | Lee | B65G 47/24 |
| 10,556,712 | B2 * | 2/2020 | Wolf | B65B 37/16 |
| 2002/0002809 | A1 | 1/2002 | Wurst et al. | |
| 2007/0057138 | A1 | 3/2007 | Esser | |

FOREIGN PATENT DOCUMENTS

| | | |
|---|---|---|
| EP | 1 917 380 B1 | 3/2009 |
| JP | 2012184078 A | 9/2012 |
| WO | WO 2010/146445 A2 | 12/2010 |

\* cited by examiner

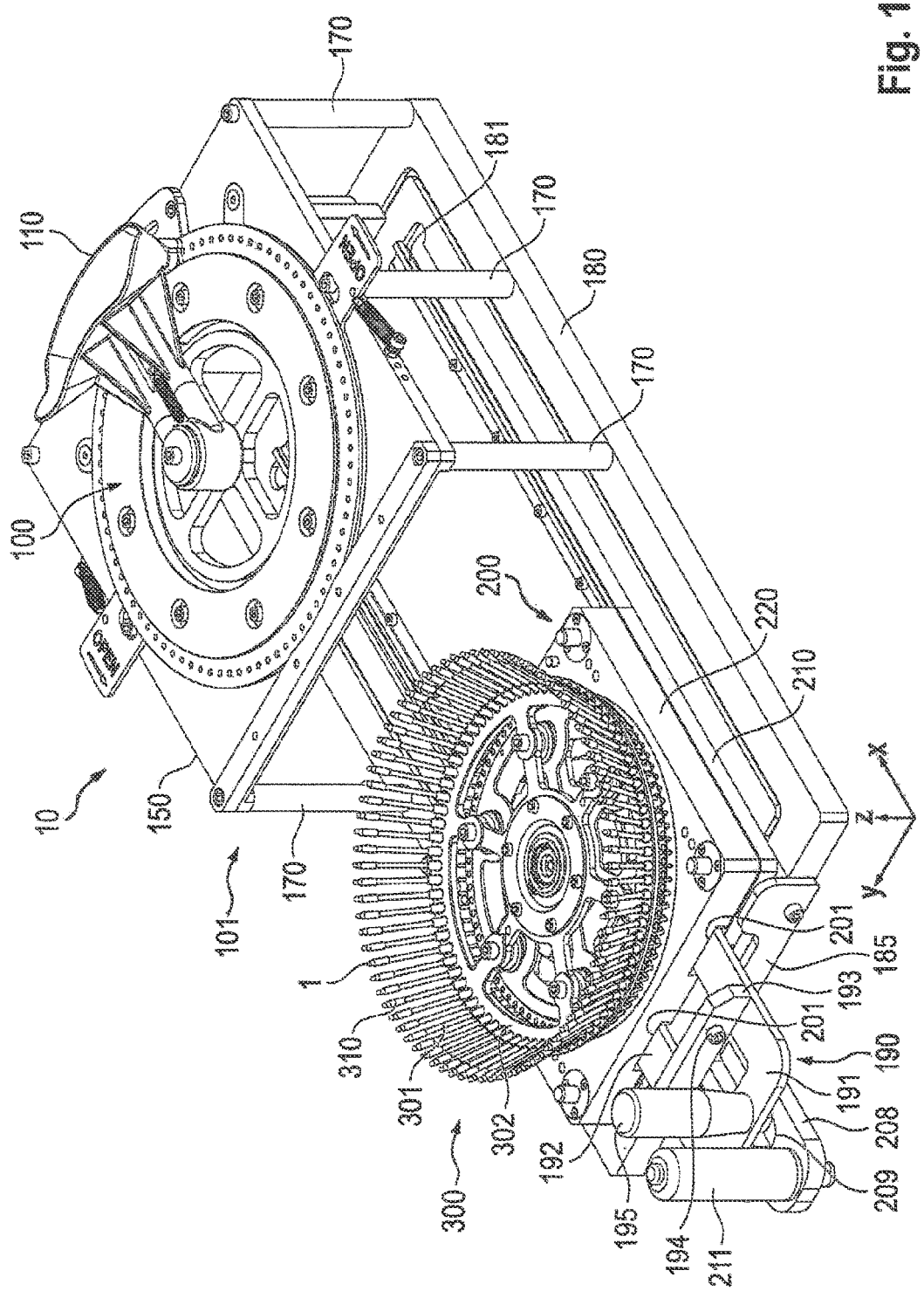

SEPARATION DEVICE FOR SUPPLYING AND SEPARATING WORKPIECES AND LOADING SYSTEM WITH A SEPARATION DEVICE AND A SUPPLY DEVICE

CROSS-REFERENCE TO RELATED APPLICATIONS

This application is a National Phase Application of PCT International Application No. PCT/EP2021/067354, International Filing Date Jun. 24, 2021, claiming the priority of German Patent Application No. 10 2020 116 888.8, filed Jun. 26, 2020, which is hereby incorporated by reference.

FIELD OF THE INVENTION

The present disclosure relates to a separation device for supplying and separating workpieces. The invention also relates to a supply device for supplying a workpiece carrier having a receiving area for receiving separately supplied or positioned workpieces. Furthermore, the present invention relates to a loading system with a separation device and a supply device.

BACKGROUND OF THE INVENTION

Separation devices and loading systems are used for loading workpiece carriers that are then used for further processing workpieces, for example workpieces in coating systems. Separation devices are used to guide multiple, disordered, compact and comparatively small workpieces or objects, such as spheres, polyhedral or spherical bodies, separately into and/or to a predetermined position, for example a receiving area on a workpiece carrier. Separation devices are thus used to first separate individual workpieces or a plurality of workpieces and then to guide and/or to position and/or to fasten them, separately or in defined groups, into and/or to respective receiving areas of a workpiece carrier of a loading system.

A supply device for supplying a workpiece carrier is used to position the workpiece carrier spatially at the separation device. In particular, the supply device is used to position the receiving area for receiving the individually positioned workpieces at the separation device.

In order to position the separated workpieces at and/or in the respective receiving areas, the workpiece carrier is moved by means of the supply device to the separation device where it is positioned. After the supply and/or positioning of the workpieces, the workpiece carrier is removed from or out of the separation device again. The supply device thus allows a loading of workpieces and a subsequent removal of the workpiece carrier.

The receiving areas of the workpiece carrier are here particularly suitable to receive, hold and fix compact workpieces, i.e., e.g., spherical (steel balls, metal balls or the like) or polyhedral (cube-shaped, ellipsoidal, pyramidal or the like) workpieces. For example, the receiving areas can be arranged on an end portion of a receiving sleeve, which is particularly designed to hold and fix the respective workpieces (e.g. has a recess). The receiving areas of the workpiece carrier can, for example, be arranged about a vertical axis in a crown-like or collar-like fashion.

In order to ensure, after the removal of the loaded workpiece carrier, a uniform coating of a partial area and/or surface and/or all surfaces of a workpiece, the workpieces can each be connected to and/or in and/or at rotary receiving areas in a force-locked and/or interlocking manner.

EP 1 917 380 B1 arrangement having a plurality of receiving areas which are arranged in a collar-like fashion, are rotatable in itself and are rotatable about a driving axle.

In order to load such workpiece carriers, the workpieces are usually arranged manually on the receiving areas. Manual loading of this type is time-consuming and can lead to an undesirable contamination of the workpieces. The contaminations on a workpiece, such as water, dust, and/or grease deposits, can greatly impair or completely prevent a subsequent uniform processing of the workpiece, for example due to a coating. Sensitive workpieces can also be damaged.

The object of the present invention is to provide an improved separation device, an improved supply device and an improved loading system, where these disadvantages are at least partially reduced.

The present invention is based on the finding that a particular arrangement of the elements of a separation device, a supply device and a loading system can make possible a fast, gentle and reliable separation and arrangement of the workpieces. In this way, workpieces can be separated and placed automatically or semi-automatically. It is thus possible to largely reduce time-consuming and problematic manual operations.

SUMMARY OF THE INVENTION

The separation device according to the invention for supplying and separating workpieces comprises a workpiece storage, a first separation disk having first separation chambers, and a supply disk having workpiece guides. The first separation disk is adjustably arranged between a receiving position and a supply position relative to the supply disk. In the supply position, the first separation chambers are arranged in alignment with the workpiece guides. The first separation chambers are designed and formed to supply workpieces arranged in the first separation chambers to the respective workpiece guides.

"In alignment" describes an arrangement in which the walls of two adjacent elements are aligned flush to one another. In the supply position, the first separation chambers are in alignment with the workpiece guides. The walls of the separation chambers and workpiece guides are here arranged relative to one another in such a way that they have a common geometrical reference axis and/or form a common wall surface, which is merely partially interrupted by the respective, mutually contacting side edges of the adjacent elements. This aligning arrangement ensures a particularly precise and gentle supply of the workpiece. Under the effect of gravity, the workpieces slide out of the separation chambers and into the adjacent workpiece guides and then through them into the respective receiving area (e.g., into a recess) of a workpiece carrier.

There are designs in which the separation device further includes a second separation disk with second separation chambers, which are designed and arranged in the receiving position of the first separation disk in alignment with the first separation chambers. In the receiving position, the first separation disk is arranged in such a way that it can receive one workpiece each in the first separation chambers, which, for example, have been positioned from a workpiece storage in a separation operation into the first separation chambers. A second separation disk can be arranged on the first separation disk. The second separation disk can be connected to the supply disk in a force-locked and/or interlocking and/or integrally bonded manner. The second separation disk can, for example, be arranged adjacent to the first separation disk. In a receiving position of the first separation disk, the second separation chambers of the second separation disk can be arranged in alignment with the first separation chambers so that during a separation process a plurality of workpieces can be arranged on top of one another or above one another in the separation chambers. As a result, this allows a plurality of workpiece carriers to be loaded with workpieces before the separation chambers have to be refilled.

There are designs in which the separation chambers and workpiece guides are arranged annularly and coaxially about a swivel pin. The term "separation chambers" comprises the first separation chambers, the second separation chambers or all separation chambers. The first separation disk, the second separation disk and/or the supply disk can have an annular and/or disk-like basic shape. "Coaxial" describes an arrangement in which a plurality of elements have a common reference axis.

For example, the separation chambers can be arranged in an edge region near the circumference of the first separation disk and/or in an edge region of the second separation disk in a circumferential direction so as to be spaced apart with the same radius or in a radial direction. For example, the workpiece guides can also be arranged in an edge region of the supply disk in a circumferential direction so as to be spaced apart with the same radius or in a radial direction. Due to the annular and/or coaxial arrangement of the separation chambers and/or the workpiece guides, a particularly fast and uniform distribution of the workpieces is facilitated.

There are designs in which the first separation disk can be moved out of its receiving position in a circumferential direction against a restoring force to its supply position. The circumferential direction can be a clockwise or counter-clockwise direction. A restoring force can be a spring force or a force of a spring. A restoring force can also be a force exerted by another element. Due to the restoring force, the first separation disk is guided out of its supply position back to its receiving position. This reduces manual adjustments for adjusting the separation disk.

There are designs in which the first separation disk can be adjustably arranged between the second separation disk and the supply disk. The first separation disk is held between the second separation disk and the supply disk. For example, the first separation disk can be mounted loosely and/or rotatably between the supply disk and the second separation disk. This arrangement ensures that the second, upper separation disk is held with the supply disk for conjoint rotation. The supply is improved insofar as only a first (lower) layer of the workpieces gets to the workpiece guides when the first separation disk is adjusted, whereas a second (upper) layer initially remains in the separation chambers of the second separation disks. The second layer does not pass from the separation chambers of the second separation disk into the separation chambers of the lower first separation disk, which then get underneath, until the first separation disk is restoraged. This facilitates the operation and/or an automatic separation or supply.

There are designs in which the workpiece guides each have a muzzle area with a guide chamfer. The term "guide chamfer" describes a beveled, curved surface created by machining an edge. For example, a workpiece guide can have an angled and/or offset guide chamfer, which may be partially circumferential. Guide chamfers in the muzzle area of the workpiece guides can be used to position and/or guide passing-through or falling workpieces with particular precision.

There are designs in which the workpiece storage is funnel-shaped. Due to a funnel-shaped design of the workpiece storage, workpieces, in particular spherical workpieces, are distributed in a particularly reliable and even fashion to the separation chambers.

There are designs in which the workpiece storage comprises a receiving area for receiving workpieces, the receiving area merging into a supply area opening in the area of the separation chambers, and the supply area being designed as a slot extending in an arc or crescent shape and encompassing a plurality of separation chambers. The term "receiving area" describes an area of the workpiece storage having a larger opening area and increased workpiece receiving volume. The supply area can be arranged below the receiving area. The term "supply area" describes in particular an area of the workpiece storage which has a tapering opening area and/or tapering basic form compared to the receiving area. For example, the supply area itself can be designed as an arcuate slot which extends over multiple separation chambers. Alternatively, the supply area can, for example, be designed as an additionally provided outlet device (e.g., a type of aperture), which has an arcuately extending slot covering a plurality of separation chambers. The arcuate slot allows a particularly rapid separation of the workpieces from the workpiece storage into the separation chambers.

There are designs in which the workpiece storage can be adjusted between a distribution position and an unloading position, the workpiece storage being rotatably arranged, in its distribution position, about a swivel pin and being arranged with its supply area in the area of the separation chambers and, in its unloading position, extending with its supply area radially outside the separation disk and the supply disk so that workpieces can be discharged out of the workpiece storage through the supply area—for example, for emptying the workpiece storage.

The term "distribution position" describes a position or placement in which the workpiece storage is rotatably mounted about a swivel pin with its supply area above the first separation disk and/or the second separation disk so that workpieces can be distributed by the workpiece storage. The term "unloading position" describes a position or placement in which the workpiece storage protrudes beyond the edge of the first separation disk and/or the second separation disk in order to cause unloading of the workpieces, for example unloading of the workpieces into an unloading device. By guiding the workpiece storage from a distribution position to an unloading position, the workpieces can be removed from the workpiece storage particularly quickly.

There are designs in which the workpiece storage can be adjusted radially to the swivel pin against a restoring force from its distribution position to its unloading position. The restoring force can, for example, be the spring force of a spring. The restoring force can also be, for example, a force exerted by another element. The restoring force causes the workpiece storage to be automatically returned from the unloading position to the distribution position and prevents unintentional emptying.

There are designs in which a spring has a first end portion that is arranged on the workpiece storage, the spring having a second end portion, which is arranged on a linear guide, formed for example as a fork guide, which is rotatably mounted about the swivel pin. The workpiece storage can have a support device, for example a cantilever device, which is movably arranged on the fork guide, the fork guide being movably mountable about the swivel pin. For example, the spring can be arranged between the support device and the fork guide.

There are designs in which at least one handle is arranged on the separation disk, the handle having a slot opening. A slot opening is, for example, a continuous opening, which is designed to limit a movement, made relative to the opening, of an element arranged in the opening—and thus determines an adjustment path of the separation disk. The handle is, for example, a grip or a tab. The handle can, for example, be arranged laterally on the first separation disk. The first separation disk can have a plurality of handles. Preferably, the handle can have two actuation elements arranged opposite to each other. The handle makes it easier for a user to operate the first separation disk.

There are embodiments in which a fixing element is arranged within the slot opening. For example, a fixing element can be a bolt, a screw, a nail, a protrusion, or a similar element. The fixing element can further be designed, for example, to connect in a force-locked and/or interlocking and/or integrally bonded manner to the element on which the fixing element is arranged. The fixing element and the slot opening can limit a possible movement of the first separation disk. Preferably, the fixing element and the slot opening are dimensioned in such a way that there can be only a relative movement of the first separation disk between the receiving position and the supply position.

A loading system according to the invention comprises a separation device according to the invention and a supply device for supplying a workpiece carrier with at least one receiving area for receiving workpieces positioned individually. The supply device comprises a guide device, a workpiece carrier with the at least one receiving area, and a lifting slide for positioning the at least one receiving area. The lifting slide comprises a plate support for receiving the workpiece carrier and a lifting device designed to lift the plate support vertically. The lifting device is designed to set a vertical spacing between the plate support and a receiving device. The guide device is designed to move the plate support in a plane parallel to the receiving device.

The receiving device can, for example, be a frame or housing assembly for receiving the separation device.

The term "lifting slide" refers to a device for transporting and positioning the receiving area or the workpiece carrier. The lifting slide can have a plate support which is suitable for receiving and/or fixing a workpiece carrier. The lifting slide can be designed in such a way that it is suitable for receiving different workpiece carriers. The plate support of the lifting slide can be designed, for example, to align and fix the workpiece. The lifting slide can be guided and held on the guide device. In particular, the guide device can be designed to move the plate support horizontally. The guide device can have a base plate and guide rails. A workpiece carrier can have one or more receiving areas. The term "receiving area" can refer to one receiving area or to multiple receiving areas.

The lifting device can be used to adjust a vertical distance between the plate support and the receiving device. The lifting device can, for example, be a mechanical, fluidic, electromechanical or electromagnetic actuation mechanism. The lifting device can comprise a lifting base plate and a wedge-type slide arranged on the lifting base plate.

A vertical lifting of the plate support corresponds to a lifting in a vertical direction perpendicular to the base plate and/or in a direction perpendicular to the receiving device. A horizontal shifting of the plate support corresponds to a shifting along a direction in a plane parallel to an extension plane of the lifting base plate and/or in a plane parallel to the receiving device.

There are designs in which the supply device also comprises a receiving device for receiving the separation device. A receiving device can, for example, be a chassis or a carrier plate with an opening or recess for the separation device. The receiving device can be designed to support the separation device. The receiving device and the separation device can be connected to one another in a force-locked and/or interlocking and/or integrally bonded manner. The receiving device can also be designed, for example, to receive different separation devices. As a result, the loading system can also be operated with different separation devices, for example modularly interchangeable separation devices.

The supply device according to the invention for supplying a workpiece carrier having at least one receiving area for receiving separately positioned workpieces comprises a lifting slide for positioning the at least one receiving area, the lifting slide comprising a plate support for receiving the workpiece carrier, and a lifting device designed to vertically lift the plate support. The supply device also comprises the guide device designed to move the plate support horizontally.

There are designs in which the supply device comprises a workpiece carrier having the at least one receiving area, and a receiving device for receiving a separation device with workpiece guides, the lifting device being designed to adjust a vertical spacing between the plate support and the receiving device, and the guide device being designed to shift the plate support in a plane parallel to the receiving device.

There are designs in which the workpiece carrier is designed to be removable and/or adjustable. The workpiece carrier can, for example, be adjustable by means of a lifting movement and/or a shifting movement of the lifting slide. The workpiece carrier can, for example, also be removed from the plate support of the lifting slide. The workpiece carrier can, for example, also have adjustable elements. Besides the workpiece carrier can also be fixed in stationary fashion on the plate support.

There are designs in which the at least one receiving area has a holding device for fixing the workpieces. The workpiece carrier can have one or more receiving areas. A receiving area can have one or more holding devices. A holding device can be a magnet, for example. A holding device can, for example, also have a mechanical and/or hydraulic and/or mechatronic holding element for fixing a workpiece.

There are designs in which the lifting device comprises a lifting base plate and a wedge-type slide, the wedge-type slide being shiftably mounted on the lifting base plate, and the wedge-type slide being designed to lift the plate support from the lifting base plate in a lifting position of the lifting slide. The plate support can be arranged on the lifting base plate. Preferably, the plate support rests on the lifting base plate. The wedge-type slide is designed to shift the plate support in a vertical direction.

There are designs in which the guide device comprises a base plate and at least one guide rail, the at least one guide rail being arranged on the base plate and being designed to guide the lifting slide. A plurality of guide rails can be arranged on the base plate. Guide rails allow a particularly precise positioning of the lifting slide.

There are designs in which the guide device has supports which carry the receiving device. The receiving device can be arranged at a distance from the base plate by means of supporting structural elements. The supports can, for example, extend perpendicularly from the base plate in a vertical direction.

There are designs in which the lifting base plate includes first profile guides, the first profile guides engaging at the at least one guide rail of the base plate. Due to the first profile guides, the lifting base plate can be arranged so as to be shiftable and/or movable on the guide rails. Profile guides can be used to precisely position the lifting slide and hold it on the guide rails.

There are designs in which the wedge-type slide has second profile guides, the second profile guides engaging on rails of the lifting base plate. By means of the second profile guides, the wedge-type slide can be shiftably mounted on the lifting base plate.

There are designs in which the guide device comprises a stop element with a latching element, the plate support including an adjustment element that is designed to connect to the latching element in a force-locked and/or interlocking manner. An adjustment element can, for example, be an adjusting bolt and/or an adjusting pin, which extends perpendicularly from the plate support in a vertical direction. The adjustment element, the latching element and the stop element allow a precise adjustment of the plate support below the separation device.

There are designs in which the lifting base plate has perpendicularly extending guide bolts, the plate support having openings, and the guide bolts being arranged within the openings. The guide bolts can, for example, extend in a vertical direction. When the plate support is lifted or lowered, the guide bolts hold and guide the plate support.

There are designs in which, in a lifting position of the lifting device, the receiving areas are separated with regard to a projection of the receiving device by a vertical positioning spacing, the positioning spacing corresponding to between 15% and 85% of the height of a workpiece. In the lifting position, the plate support is lifted so that the plate support does not rest on the lifting base plate. A lifting position also corresponds, for example, to a retracted position or retracted placement of the wedge-shaped slide. In contrast, the plate support can, for example, rest on the lifting base plate in a lowered position or be arranged so as to be spaced apart from the plate support by a smaller distance compared to the lifting position. Furthermore, in the lowered position, the lifting base plate and the plate support can also form an air gap, the air gap having a width of between 2 mm and 8 mm, preferably between 4 mm and 6 mm and most preferably of 5 mm. The lowered position corresponds to an extended position or extended placement of the wedge-type slide. The vertical positioning spacing, or vertical spacing, can correspond, for example, to a distance between the receiving area and a surface of the receiving device in the vertical direction. In the case of a vertical positioning spacing between 15% and 85% of the height of the workpiece, the workpiece is guided and held in particularly reliable way during its positioning on and/or in the receiving area.

Further aspects and features of the present invention are apparent from the dependent claims, the accompanying drawing and the following description of the embodiments.

BRIEF DESCRIPTION OF THE DRAWINGS

Embodiments of the invention are now described by way of example and with reference to the attached drawing. Here:

FIG. 1 shows a schematic perspective illustration of an exemplary embodiment of a loading system according to the invention with a separation device according to the invention and a supply device;

DESCRIPTION OF EMBODIMENTS

Figure 2A:
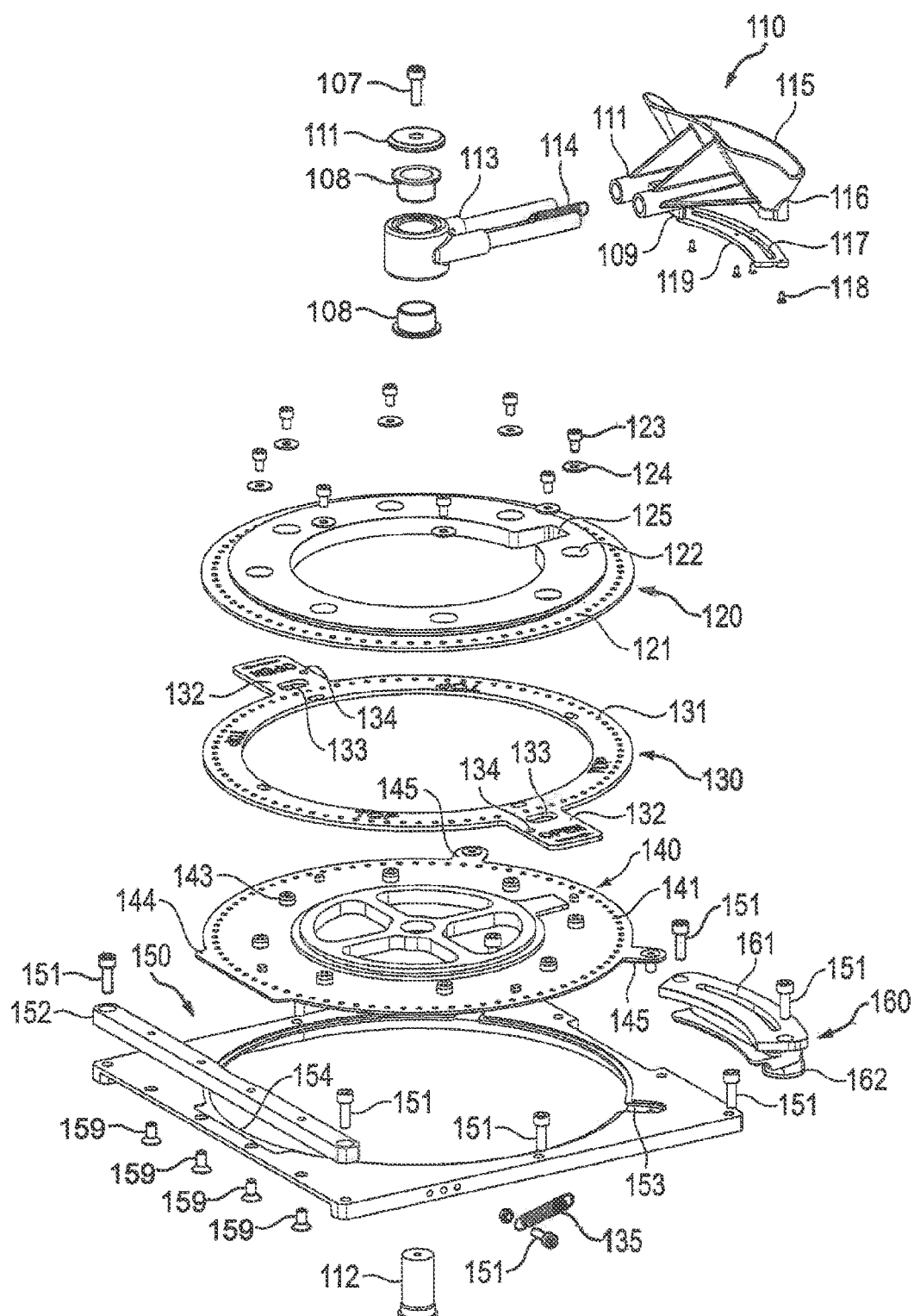
FIG. 2A shows a schematic exploded view of the separation device according to the invention with a receiving device.

FIG. 1 shows a schematic perspective view of a loading system 10 with a separation device 100 and a supply device 101.

In the illustrations of FIGS. 1 to 9B, the loading system 10 carries a workpiece carrier 300 or a workpiece support with collar-like or crown-like structure. The collar-like workpiece carrier 300 has a plurality of pin-shaped holders 301 or workpiece holders, so-called pins. In this regard, each of the holders 301 has a receiving area 310. The receiving area 310 is suitable for accommodating and/or holding a workpiece 1. The holders 301, each of which has an end portion which is arranged on a plate-shaped base plate 302 of the workpiece carrier 300, are coaxially aligned with one another. By means of the holders 301, the receiving areas 310 are arranged so as to be spaced apart from one another in a circumferential direction with the same radius or in a radial direction. The workpieces 1 are ball-shaped or spherical. A receiving area 310 can comprise a holding device (not shown). A holding device can be, for example, a magnet. The workpiece carrier 300 can also be described as a workpiece support or a workpiece holder.

The workpiece carrier 300 is arranged on a lifting slide 200. The lifting slide 200 has a plate support 220 or a plate sheet as well as a wedge-type slide 190 and a lifting base plate 210. The wedge-type slide 190 and the lifting base plate 210 together form a lifting device referred to as 190, 210. The lifting slide 200 has a cuboidal basic shape. The plate support 220 of the lifting slide 200 carries the workpiece carrier 300. The plate support 220 rests on the lifting device 190, 210. The lifting device 190, 210 is thus arranged below the plate support 220. The wedge-type slide 190 of the lifting device 190, 210 is fork-shaped. The wedge-type slide 190 is arranged between the plate support 220 and the lifting base plate 210. The side walls of the plate support 220 are in alignment with the side walls of the lifting base plate 210. One side wall of the plate support 220 and one side wall of the lifting base plate 210 together form two side openings 201, through each of which a tooth 192 of the wedge-type slide 190 is passed. The side openings 201 are each located outside the center of the side wall so that they can be referred to as lateral side openings. The two teeth 192 extend from a trowel extension 191 of the wedge-type slide 190 between the plate support 220 and the lifting base plate 210.

A stop plate 193 extends in a vertical direction above the two teeth 192. The stop plate 193 is connected to the teeth 192 in a force-locked and/or interlocking and/or integrally bonded fashion. The stop plate 193 has two adjusting screws 194, which are arranged parallel to the teeth 192.

A grip 195 extends in a perpendicular direction through an opening (not shown) of the trowel extension 191 of the wedge-type slide 190. The grip 195 is fastened by means of a screw cap to the trowel extension 191. The screw cap is arranged within a slot opening 209 of a shaft 208 of the lifting base plate 220. The shaft 208 of the lifting base plate 210 extends perpendicularly from a side of the lifting base plate 210 in a horizontal direction. The trowel extension 191 of the wedge-type slide 190 is movably mounted on the shaft 208. A pin 211 is arranged perpendicularly on an end portion of the shaft 208. The pin 211 is thus arranged parallel to the grip 195 of the wedge-type slide 190.

A base plate 180 or lifting base plate has a cuboidal basic shape. A longitudinal direction X of the base plate 180 is defined by its long side. The side of the base plate 180 which is shorter compared thereto defines a width direction Y. The longitudinal direction X and the width direction Y define an extension plane of the base plate 180.

A stop plate 185 is arranged along the width direction on an end portion of the base plate 180. The shaft 208 of the lifting base plate 210 rests on the stop plate 185 in the state shown.

The lifting base plate 210 is mounted on two guide rails 181 of the base plate 180 that extend in parallel. The guide rails 181 and the base plate 180 form a guide device 180, 181. The guide device 180, 181 is designed to effect a horizontal shifting of the lifting slide 200. This allows the plate support 220 to be shifted horizontally along the longitudinal direction X.

The base plate 180 can be divided into a first partial area and a second partial area; in the first partial area, a plurality of mutually spaced supports 170 extend perpendicularly from the base plate 180 in a vertical direction. The second partial area of the base plate 180, on the other hand, has no supports. In the first partial area, the supports 170 are arranged circumferentially to the guide rails 181. The supports 170 hold or carry a receiving device 150. The receiving device 150 has a cuboidal basic shape. The supports 170 hold the receiving device 150 in a plane parallel to the extension plane of the base plate 180 and at a distance from the base plate 180. The receiving device 150 holds or carries the separation device 100.

Figure 2B:
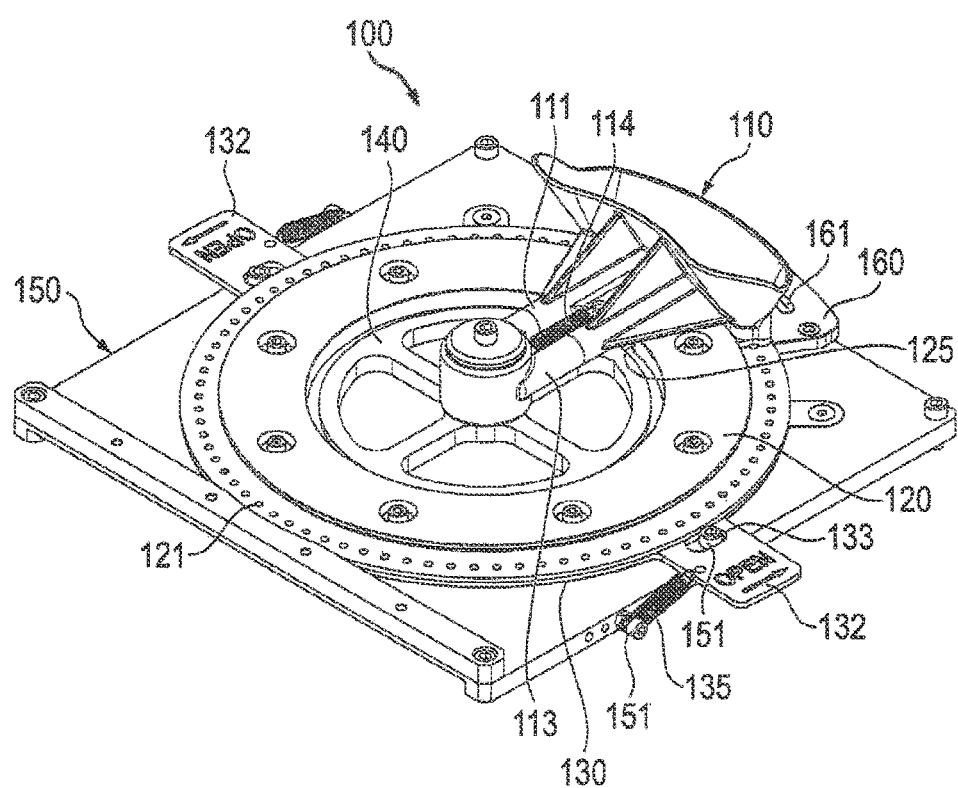
FIG. 2B shows a schematic perspective view of the mounted separation device from FIG. 2A.

FIG. 2A shows a schematic exploded view of the separation device 100 with the receiving device 150 of the supply device 101. FIG. 2B shows a schematic perspective view of the separation device 100 as it is arranged on the receiving device 150 of the supply device 101.

The separation device 100 for supplying and separating workpieces has a first separation disk 130 with a plurality of first separation chambers 131. A first separation chamber 131 corresponds to a circular through-opening. The separation disk 130 has an annular basic shape. The separation chambers 131 are arranged with the same radius in a circumferential or radially circumferential fashion in an edge region of the first separation disk 130. Two handles 132 are arranged on two opposing outer edges of the first separation disk 130. Each of the handles 132 has a slot opening 133.

A supply disk 140 has an annular basic shape. The first separation disk 130 is rotatably or adjustably mounted on the supply disk 140. The first separation disk 130 is therefore adjustable in the circumferential direction. The outer edges of the first separation disk 130 and the outer edges of the supply disk 140 are designed in sectional alignment with each other. The supply disk 140 has a plurality of workpiece guides 141. A workpiece guide 141 corresponds to a circular through-opening, the workpiece guide 141 having a guide chamfer (not shown) in a muzzle area. The supply disk 140 is arranged on a swivel pin 112. The supply disk 140 is arranged on the receiving device 150 via a force-locked and/or interlocking connection. For this purpose, the supply disk 140 has two fixings 145, which are spaced apart from one another and extend perpendicularly from one side of the supply disk 140. A fixing 145 is designed to be received by a respective corresponding cutout 153 of the receiving device 150. The supply disk 140 also includes a plurality of fixing sleeves 143, which are coaxially arranged about the swivel pin 112, the fixing sleeves 143 extending perpendicularly in a vertical direction from a surface of the supply disk 140. A fixing sleeve 143 is designed to enter into a force-locked and/or interlocking connection to a fastening element 123 of a second separation disk 120.

The second separation disk 120 is arranged above the first separation disk 130 and has a plurality of second separation chambers 121. The second separation disk 120 has an annular basic shape. The second separation disk 120 is connected to the fixing sleeves 143 of the supply disk 140 by means of a plurality of bores 122 and the plurality of fastening elements 123 in a force-locked and/or inter-locking manner. In each case, a perforated disk 124 is arranged below each fastening element 123. Each of the second separation chambers 121 corresponds to circular through-openings. The number of the first separation chambers 131, of the second separation chambers 121 and of the workpiece guides 141 is the same. The separation chambers 121, 131 and the workpiece guides 141 are annularly and/or coaxially arranged about the swivel pin 112.

The receiving device 150 has a cuboidal basic shape as well as a circular disk-shaped recess. In an edge region of the receiving device 150, a clamping rib 152 is arranged, which extends in a perpendicular direction from a surface of the receiving device 150. The clamping rib 152 is connected by means of a plurality of fixing elements 151 and a plurality of bolts 159 to the receiving device 150 in a force-locked and/or interlocking manner. The receiving device 150 has a recess 154 below the clamping rib 152. The recess 154 is designed to receive a clamping lug 144 of the supply disk 140 which is fixed by the clamping rib 152.

On two further, opposite sides of the receiving device 150, fixing elements 151 are arranged in a horizontal direction, to each of which a spring 135 is fixed. Each of the springs 135 is attached at its other end to one of the handles 132 of the first separation disk 130. The handles 132 each have a bore 134 for this purpose. The receiving device 150 also has two fixing elements 151, which extend perpendicularly to a surface of the receiving device 150 in a vertical direction and are connected to the receiving device 150 in a force-locked and/or interlocking manner, in each case one end portion of the end portion of the fixing elements 151 being arranged inside the slot opening 133 of the first separation disk 130.

In an edge region of the receiving device 150, an unloading device 160 is arranged on a further side. The unloading device 160 has an arcuate slot 161, which is designed to guide workpieces to an unloading path 162 (not shown) formed below the slot.

A workpiece storage 110 is rotatably mounted about the swivel pin 112. The workpiece storage 110 is funnel-shaped. The workpiece storage 110 has a receiving area 115 for receiving workpieces 1. The receiving area 115 merges into an arc-shaped supply area 116. An outlet device 119 is arranged on the supply area 116 by means of a plurality of connectors 118 and has an arcuately extending slot 117 that embraces a plurality of first and second separation chambers 121, 131.

The workpiece storage 110 also has a support device 111, which is movably arranged on a fork guide 113. The support device 111 further has a detent lug 109, which extends perpendicularly from the support device 111 in a vertical direction. The detent lug 109 is designed to engage with a notch 125 arranged on the second separation disk 120, in an interlocking manner. In a distribution position, the workpiece storage 110 is arranged rotatably about the swivel pin 112 and with its supply area 116 in the area of the first and second separation chambers 121, 131. In an unloading position (not shown), the workpiece storage 110 extends with its supply area 116 radially outside the second separation disk 120 and/or the supply disk 140.

The fork guide 113 is rotatably mounted about the swivel pin 112. A spring unit 114 is arranged between the fork guide 113 and the support device 111. Two support rings 108, which stabilize the fork guide 113, are arranged between the swivel pin 112 and the fork guide 113. A cover disk 111 is arranged above the fork guide 113, the cover disk 111 being fixed to the swivel pin 112 by means of a screw element 107.

FIG. 2B shows a schematic perspective view of the separation device 100 inside the receiving device 150. In the illustration of FIG. 2B, the workpiece storage 110 is in its distribution position, into which it is rotatable about the swivel pin 112. In the area of the notch 125, the workpiece storage 110 is radially adjustable relative to the swivel pin 112 (not shown) against the restoring force of the spring 114 from its distribution position to an unloading position (not shown in FIG. 2B). In the arrangement shown in FIG. 2B, the first separation disk 130 is in the receiving position. In the receiving position, the first and second separation chambers 121, 131 are arranged in alignment one above the other. By rotating the first separation disk 130 counterclockwise to the supply position, the first separation chambers 131 can be aligned with the workpiece guides 141 of the supply disk 140 (not shown).

Figure 3A:
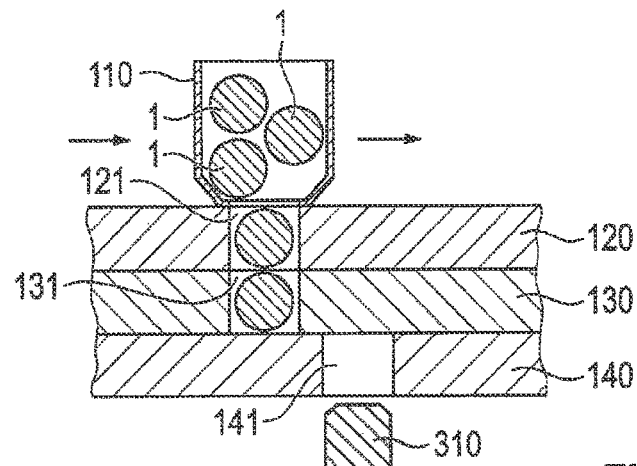
FIG. 3A schematically shows a first functional position of the separation device.

FIG. 3A schematically shows a step of using the separation device. The first separation disk 130 is in its receiving position. The first separation chambers 131 are aligned with the second separation chambers 121. The workpiece storage 110, which rotates in its distribution position, distributes workpieces 1 into the first separation chamber 131 and the second separation chamber 121. FIG. 3A shows two workpieces 1 within the separation chambers 121, 131, namely FIG. 3A shows one workpiece 1 each within the first separation chamber 131 and the second separation chamber 121.

Figure 3B:
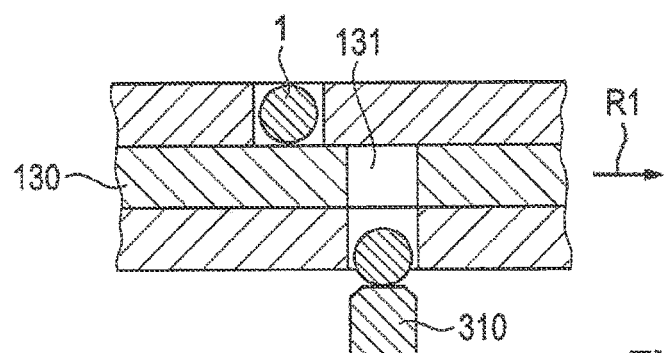
FIG. 3B schematically shows a second functional position of the separation device.

FIG. 3B schematically shows a second step of using the separation device. The first separation disk 130 is now in its supply position. In the supply position, the first separation chamber 131 is arranged in alignment with the workpiece guide 141 of the supply disk 140. Compared to FIG. 3A, FIG. 3B shows a state in which the first separation disk 130 has been moved in the circumferential direction or with a constant radius about the swivel pin 112 (not shown) in a direction R1. Workpiece 1, previously arranged in the first separation chamber 131, is here supplied to the workpiece guide 141. A guide chamfer 142 (not shown) in the muzzle area of the workpiece guide 141 positions the falling workpiece 1 at the receiving area 310 of the workpiece carrier 300 (not shown).

Figure 3C:
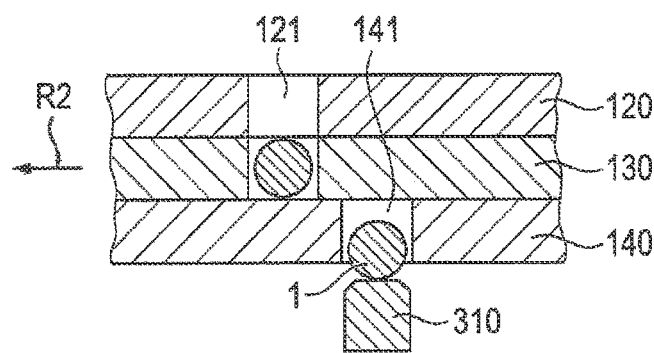
FIG. 3C schematically shows a third functional position of the separation device.

FIG. 3C schematically shows a third step of using the separation device. The first separation disk 130 is here again in its receiving position. In comparison to FIG. 3B, FIG. 3C shows a state in which the separation disk 130 has been moved in the circumferential direction or with a constant radius about the swivel pin 112 (not shown) in the direction R2, which is opposite to the direction R1. Workpiece 1, which was previously arranged in the second separation chamber 121, is here supplied to the first separation chamber 131, where it remains until the second use step is repeated.

Figure 4:
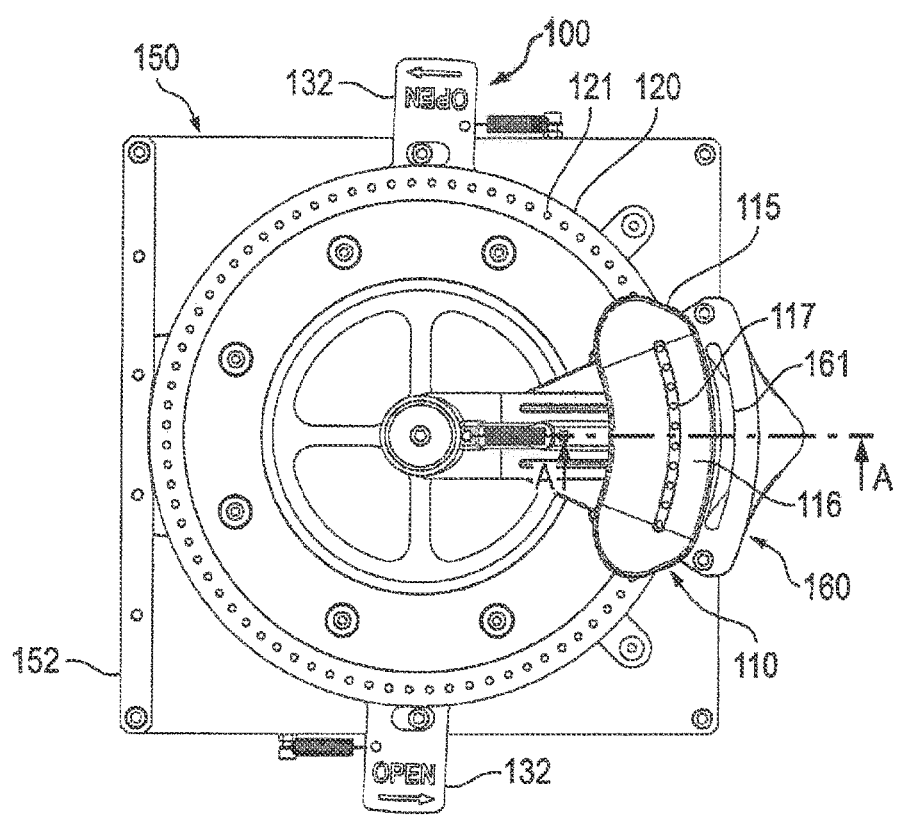
FIG. 4 shows a schematic top view of the separation device from FIG. 2B.

FIG. 4 schematically shows a top view of the separation device 100 in the receiving device 150. The first separation disk 130 is in its receiving position. The workpiece storage 110 is in its distribution position, it being rotatably mounted about the swivel pin 112 (not shown). The arcuate slot 117 of the workpiece storage 110 embraces ten second separation chambers 121. Therefore, a plurality of separation chambers can be simultaneously filled with workpieces due to the arcuate slot 117.

Figure 5A:
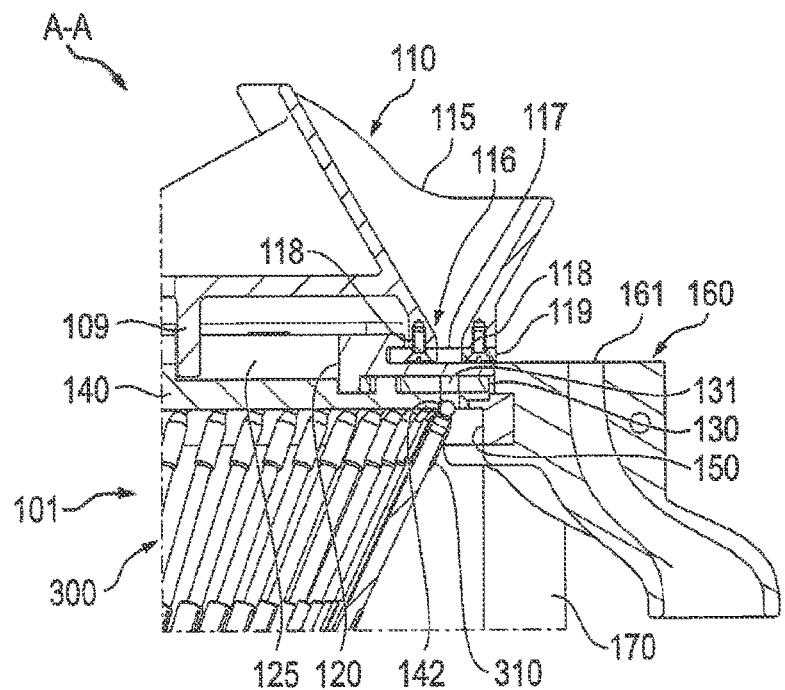
FIG. 5A schematically shows an enlarged partial sectional view along a sectional line A-A in FIG. 4, a first separation disk being shown in a supply position.

FIG. 5A schematically shows a section along the line of intersection A-A from FIG. 4, the first separation disk 130 being now in its supply position. The receiving area 115 merges into a supply area 116. The supply area 116 opens in the area of the first separation chambers 131 and second separation chambers 121 (not shown). In the arrangement shown in FIG. 5, the lifting slide 200 (not shown) below the separation device is in a lifting position.

Figure 5B:
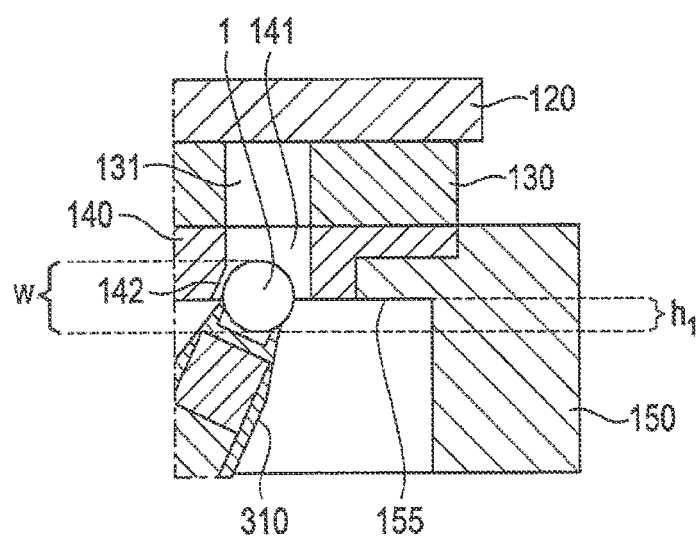
FIG. 5B shows an enlarged section from FIG. 5A.

FIG. 5B shows an enlarged section from FIG. 5A. The first separation disk 130 is in its supply position. At one end portion, the receiving device 150 has a projection 155, which extends perpendicularly from the receiving device 150 in a direction directed at the swivel pin 112 (not shown). The supply disk 140 is attached to or on the projection 155 in a force-locked and/or interlocking and/or integrally bonded manner. In a lifting position, the receiving areas 310 are separated with regard to the projection 155 by a vertical positioning spacing $h_1$. The workpiece 1 has a workpiece height W. In the lifting position, the positioning spacing $h_1$ is between 15% and 85% of the height W of the workpiece 1. This prevents the workpiece W from falling out when it is supplied to the holder 301.

Figure 6:
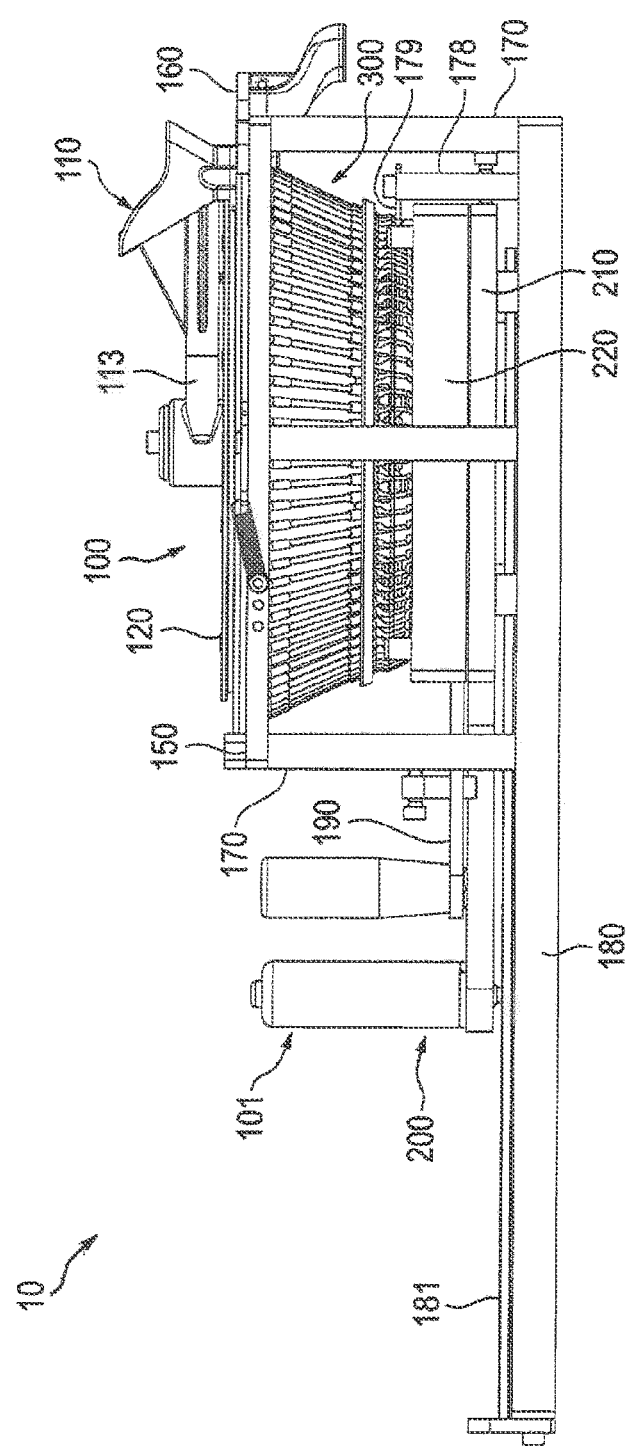
FIG. 6 shows a schematic side view of the FIG. 1 loading system according to the invention.

FIG. 6 shows a schematic side view of the loading system 10. The guide rails 181 are arranged on the base plate 180. The guide rails 181 are designed to horizontally position the lifting slide 200 positioned thereon. The workpiece carrier 300 is arranged on the plate support 220 of the lifting slide 200. The plate support 220 is arranged on the lifting device 190, 210. The lifting slide 200 is in its lowered position. The wedge-type slide 190 is extended. In a lifting position (not shown), the lifting device 190, 220 vertically lifts the plate support 220 and thus the workpiece carrier 300. A stop element 178 is arranged in an end region of the base plate 180. The stop element 178 extends perpendicularly from the base plate 180 in a vertical direction. The stop element 178 is designed to limit the positioning of the lifting slide 200. A latching element 179 is arranged on the stop element 178. The latching element 179 extends perpendicularly to the stop element 178 in a horizontal direction. The latching element 179 is designed to form an interlocking connection with an adjusting element 221 (not shown) of the lifted plate support 220.

Figure 7A:
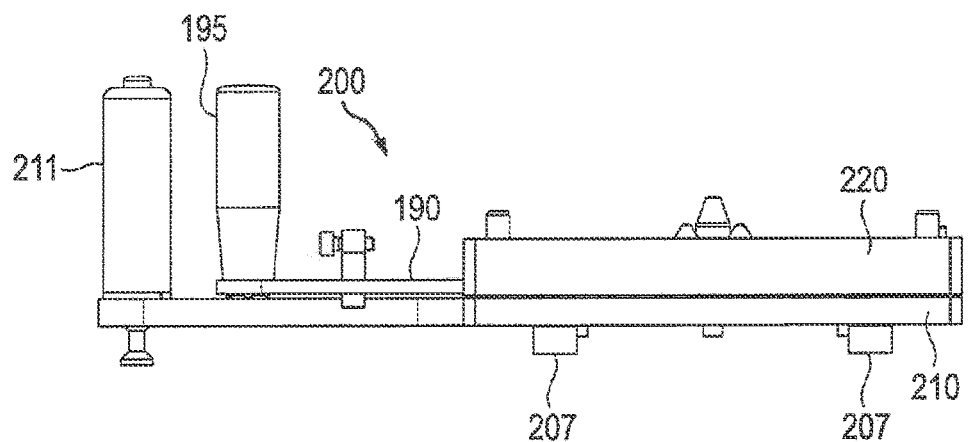
FIG. 7A shows a schematic side view of a lifting slide in a lowered position.
Figure 7B:
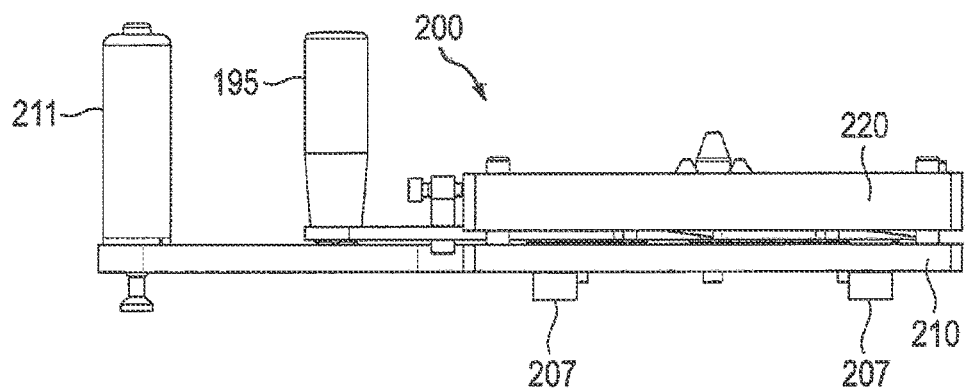
FIG. 7B shows a schematic side view of the lifting slide in a lifted position.

FIG. 7A shows the lifting slide 200 in a lowered position. The wedge-type slide 190 is here extended. FIG. 7B shows the lifting slide 200 in a lifting position. The wedge-type slide 190 is here retracted. Profile guides 207 extend from an underside of the lifting base plate 210 and are designed to guide the lifting slide 200 on the guide rails 181.

Figure 8:
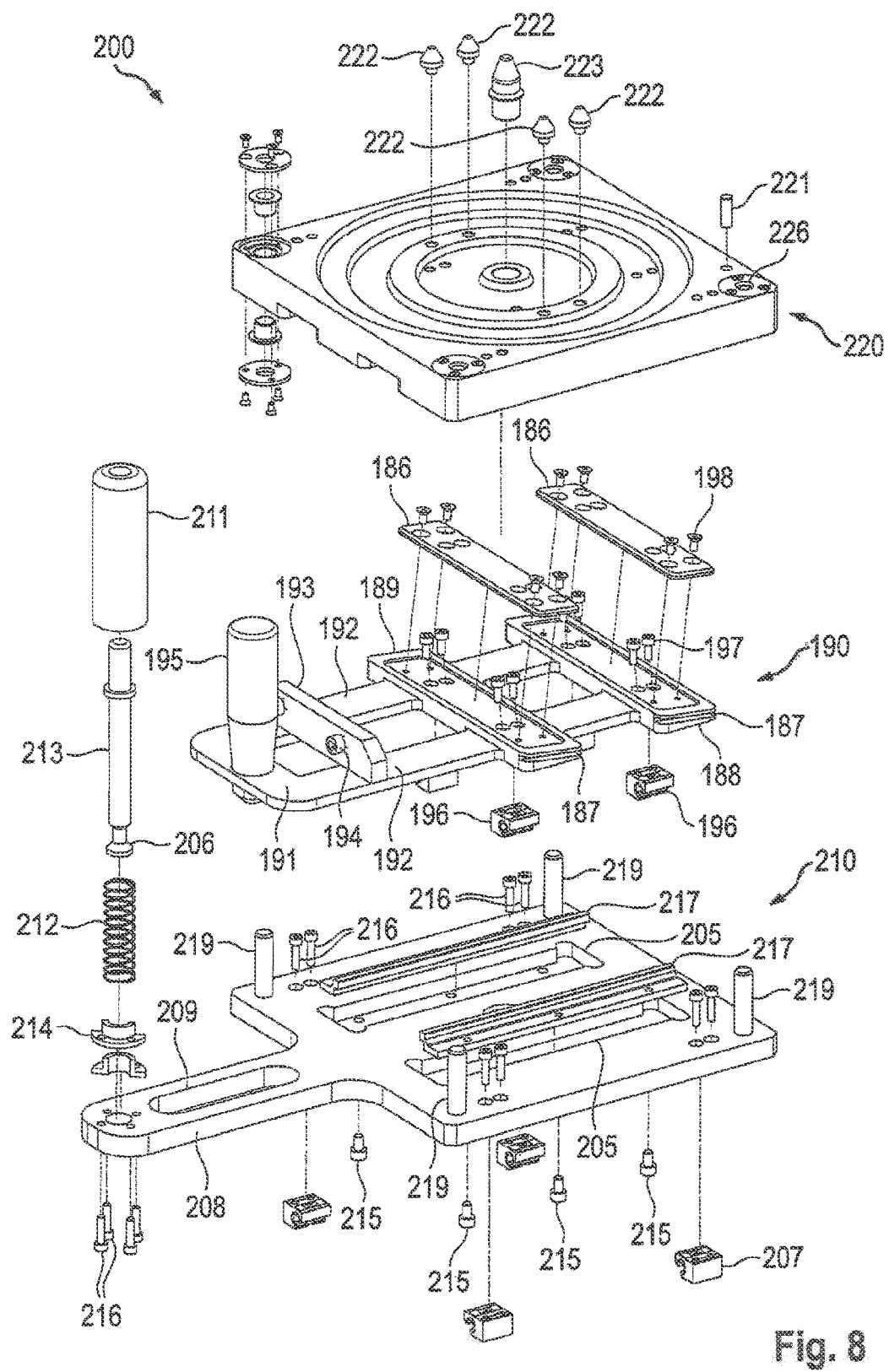
FIG. 8 shows a schematic exploded view of the lifting slide.

FIG. 8 is a schematic exploded view of the lifting slide 200. The lifting base plate 210 has the four first profile guides 207, which are arranged on the underside of the lifting base plate 210. Each of the four profile guides 207 is connected to the lifting base plate 210 by means of a plurality of fixing elements 216 in a force-locked and/or interlocking manner. On a further side, the lifting base plate 210 has two cavities 205, which are spaced parallel from one another and in each of which a rail 217 is arranged. The two rails 217 are each connected by means of a plurality of fixing elements 215 to the lifting base plate 210 in a force-locked and/or interlocking manner. The lifting base plate 210 has four corner regions. In each of the four corner regions, one guide bolt 219 is arranged, which extends perpendicularly from the lifting base plate 210. The guide bolts 219 are designed to guide the plate support 220, the guide bolts 219 passing through corresponding openings 226 of the plate support 220.

The pin 211, which is arranged perpendicularly on the shaft 208 of the lifting base plate 210, has a compression spring mechanism. A bolt 213 and a spring 212 surrounding the bolt 213 are arranged inside the pin 211, the spring 212 having an end portion which is mounted on two half-rings 214. The two half-rings 214 extend perpendicularly from an end portion of the shaft 208, to which they are connected by means of a plurality of fixing elements 216 in a force-locked and/or or interlocking manner. The bolt 213 has, in an end portion oriented to the base plate 180, a head 206, which is designed to form a locking mechanism with a recess (not shown) of the base plate 180.

The wedge-shaped slide 190 has four second profile guides 196, which are arranged on an underside of the wedge-type slide 190 by means of a plurality of fixing elements 197. The second profile guides 196 are designed to allow a horizontal shifting of the wedge-type slide 190 along the rails 217 of the lifting base plate 210.

The wedge-shaped slide 190 includes two wedge-type crossbars 188, 189. The first crossbar 189 is arranged in a central portion of the wedge-type slide 190. The second crossbar 188 is arranged parallel to the first crossbar 189 in an end portion of the wedge-type slide 190. The crossbars 188, 189 are each oriented at right angles to the two teeth 192. The crossbars 188, 189 extend on and between the two teeth 192. The crossbars 188, 189 each have guide grooves 187 on two outer sides or lateral sides, the guide grooves 187 extending obliquely with respect to the teeth 192. The guide grooves 187 are designed to engage (not shown) at or in guides 230 in the interior of the plate support 220. A sliding part 186 is respectively arranged on the crossbars 188, 189. The sliding part 186 is arranged on the crossbar by means of a plurality of fixing elements 198. The sliding parts 186 are exchangeable, as a result of which the height of the lift of the plate support 220 can be adjusted.

The plate support 220 is mounted on the wedge-type slide 190 and the lifting base plate 210. The openings 226 in the corner regions of the plate support 220 allow, when the wedge-type slide 190 is moved in a horizontal direction, the plate support 220 to be shifted along the guide bolts 219 in a vertical direction. The plate support 220 has a central centering element 223, which extends perpendicularly from a center point of the plate support 220 in the vertical direction. The plate support 220 has four additional centering devices 222 which are smaller as compared to the centering element 223. The smaller centering devices 222 also extend perpendicularly from the plate support 220 parallel to the centering element 223.

The adjusting element 221 of the plate support 220 is cylindrical, and it extends perpendicularly from the plate support 220 parallel to the centering element 223. The adjusting element 221 is arranged in an edge region of the plate support 220. The adjusting element 221 is designed to form an interlocking connection to the latching element 179 of the base plate 180 in a lifting position of the lifting slide 200.

Figure 9A:
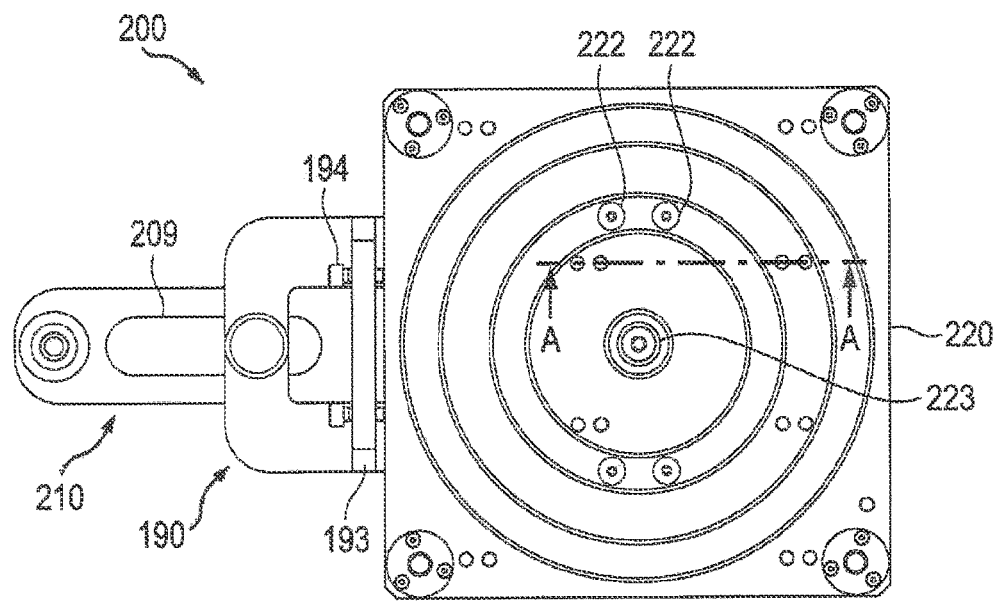
FIG. 9A shows a schematic top view of the lifting slide in a lifted position.
Figure 9B:
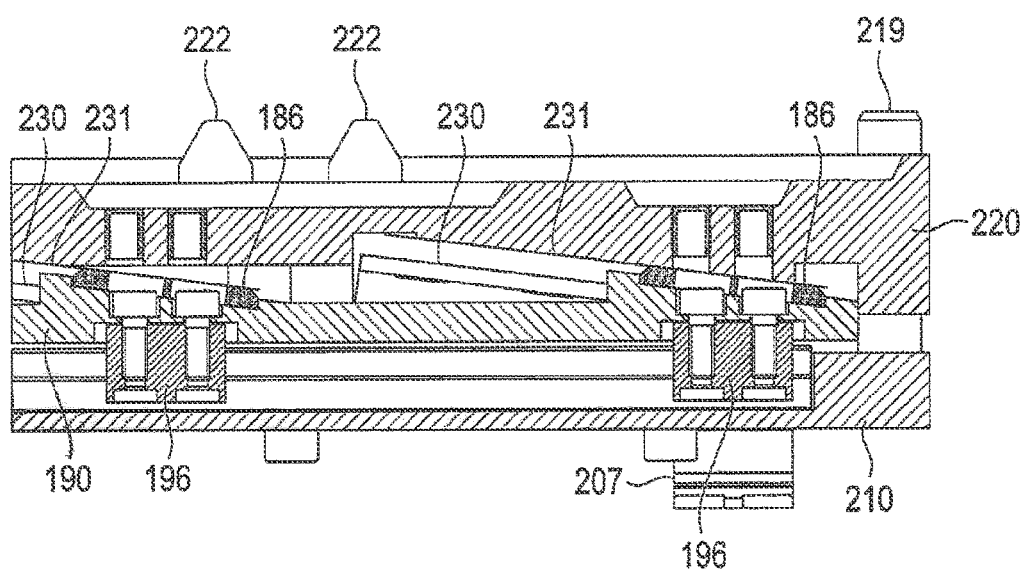
FIG. 9B shows a schematic view of the lifting slide along a sectional line A-A in FIG. 9A.

FIG. 9A shows a schematic top view of the lifting slide 200 in a lifting position. FIG. 9B shows a schematic illustration of the lifting slide 200 along the line of intersection A-A from FIG. 9A. The wedge-type slide 190 is retracted. The plate support 220 includes the guides 230 extending obliquely on the inner sides of the housing, which guides are designed to guide the wedge-type slide 190. When the lifting slide 200 moves from the lowered position to the lifted position, the wedge-type slide 190 is guided along the slot opening 209 in a direction towards the plate support 220 until the adjusting screws 194 of the stop plate 193 touch an outer housing side of the plate support 220. At the same time, the wedge-type slide 190 moves along the guides 230, and the sliding parts 186 each run along two inclined ceiling surfaces 231 in an inner housing of the plate support 220. The ceiling surfaces 231 are aligned parallel to the guides 230. Each of the sliding parts 186 is moved along the ceiling surfaces 231 during a forward movement of the wedge-type slide 190, the plate support 220 being vertically lifted. This also raises the workpiece carrier 300 (not shown in FIGS. 9A and 9B).

Figure 10:
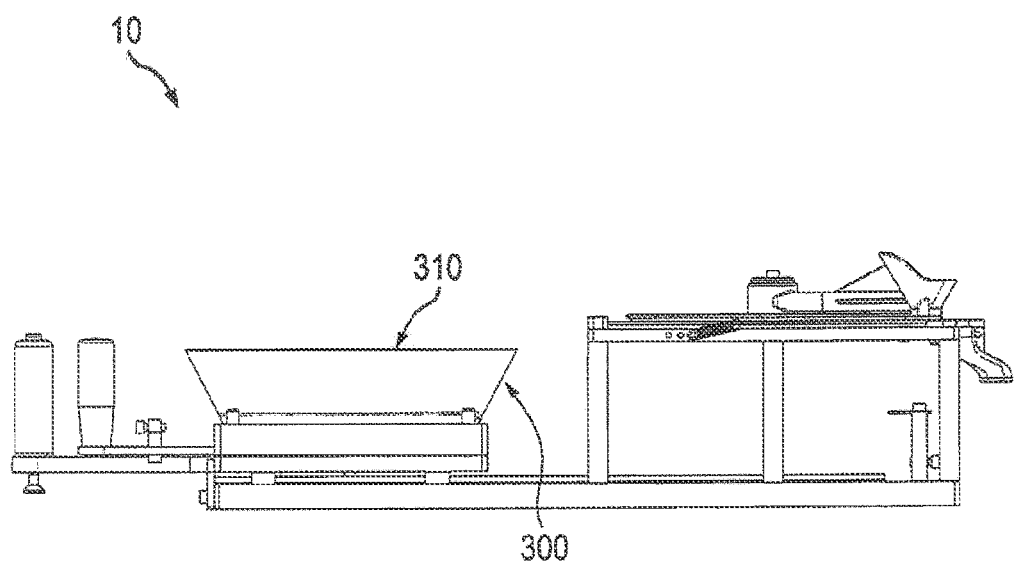
FIG. 10 shows a side view of the loading system with a bowl-shaped workpiece support.

FIG. 10 shows a side view of the loading system 10 or load system. In contrast to the illustrations in FIGS. 1 to 9B, the loading system 10 carries in this situation a bowl-shaped workpiece carrier 300 instead of the collar-like workpiece carrier 300 with the plurality of holders 301. This bowl-shaped workpiece carrier 300 is provided with a circular receiving area 310, and it is arranged on the plate support 220. The lifting slide 200 is in a lowered position and removal position. The bowl-shaped workpiece carrier 300 is used in place of the collar-like workpiece carrier 300 to remove workpieces 1 remaining in the separation device after a previous separation, as shown in FIG. 3C. In addition, the use of a bowl-shaped workpiece holder 300 also allows for the portioning of workpieces 1.

The invention also relates to aspects of the following features:

A separation device (100) for supplying and separating workpieces (1), comprising:
 a workpiece storage (110);
 a first separation disk (130) having first separation chambers (131); and
 a supply disk (140) with workpiece guides (141);
 wherein the first separation disk (130) is arranged between a receiving position and a supply position so as to be adjustable with regard to the supply disk (140);
 the first separation chambers (131) are arranged, in the supply position, in alignment with the workpiece guides (141); and the first separation chambers (131) are designed to supply workpieces (1) arranged in the first separation chambers (131) to the respective workpiece guides (141).

Separation device (100), further comprising a second separation disk (120) with second separation chambers (121) which, in the receiving position of the first separation disk (130), are designed and arranged in alignment with the first separation chambers (131).

Separation device (100), wherein the separation chambers (131; 121) and workpiece guides (141) are arranged annularly and coaxially about a swivel pin (112).

Separation device (100), wherein the first separation disk (130) is adjustable out of the receiving position in a circumferential direction against a restoring force to the supply position.

Separation device (100), wherein the first separation disk (131) is arranged between the second separation disk (120) and the supply disk (140).

Separation device (100), wherein the workpiece guides (141) each have a muzzle area with a guide chamfer (142).

Separation device (100), wherein the workpiece storage (110) is funnel-shaped.

Separation device (100), wherein the workpiece storage (110) comprises a receiving area (115) for receiving workpieces, the receiving area (115) merging into a supply area (116) opening in the area of the separation chambers (121; 131), and the supply area (116) is designed as an arcuately extending slot (117) embracing a plurality of separation chambers (121; 131).

Separation device (100), wherein the workpiece storage (110) is adjustable between a distribution position and an unloading position;
the workpiece storage (110) is rotatable, in its distribution position, about the swivel pin (112), and is arranged with its supply area (116) in the area of the separation chambers (121; 131); and
the workpiece storage (110) runs, in its unloading position, with its supply area (116) radially outside the separation disk (130) and the supply disk (140) so that workpieces are conveyable out of the workpiece storage (110) through the supply area (116).

Separation device (100), wherein the workpiece storage (110) is radially adjustable to the swivel pin against a spring force from its distribution position to its unloading position.

Separation device (100), wherein a spring (114) has a first end portion, which is arranged on the workpiece storage (110), and the spring (114) has a second end portion which is arranged on a fork guide (113), which is rotatably mounted on the swivel pin (112).

Separation device (100), wherein at least one handle (132) is arranged on the first separation disk (130), and the handle (132) has a slot opening (133).

Separation device (100), wherein a fixing element (151) is arranged inside the slot opening (133).

Supply device (101) for supplying a workpiece carrier (300) having at least one receiving area (310) for receiving separately positioned workpieces, comprising: a lifting slide (200) for positioning the at least one receiving area (310), wherein the lifting slide (200) comprises:
a plate support (220) for receiving the workpiece carrier (300); and
a lifting device (190, 210) designed to vertically lift the plate support (220); and the supply device (101) or the lifting slide (200) comprises:
a guide device (180, 181) designed to horizontally shift the plate support (220).

Supply device (101), further comprising a workpiece carrier (300) having the at least one receiving area (310); and a receiving device (150) for receiving a separation device (100) having workpiece guides (141);
wherein the lifting device is designed to adjust a vertical spacing between the plate support (220) and the receiving device (150), and
the guide device (180, 181) is designed to shift the plate support (220) in a plane parallel to the receiving device (150).

Supply device (101), wherein the workpiece carrier (300) is designed to be removable and/or adjustable.

Supply device (101), wherein the at least one receiving area (310) has a holding device for fixing the workpieces.

Supply device (101), wherein the lifting device (190, 210) comprises a lifting base plate (210) and a wedge-type slide (190), the wedge-type slide (190) being slidably mounted on the lifting base plate (210); and the wedge-type slide (190) is designed to lift, in a lifting position of the lifting slide (200), the plate support (220) from the lifting base plate (210).

Supply device (101), wherein the guide device (180, 181) comprises a base plate (180) and at least one guide rail (181), the at least one guide rail (181) being arranged on the base plate (180) and being designed to guide the lifting slide (200).

Supply device (101), wherein the guide device (180, 181) includes supports (170) that support the receiving device (150).

Supply device (101), wherein the lifting base plate (210) has first profile guides (207), and the first profile guides (207) engage at the at least one guide rail (181) of the base plate (180).

Supply device (101), wherein the wedge-type slide (190) comprises second profile guides (196), the second profile guides (196) engaging at rails (217) of the lifting base plate (210).

Supply device (101), wherein the guide device (180, 181) includes a stop element (178) having a latching element (179), and
the plate support (220) has an adjusting element (221) designed to connect to the latching element (179) in a force-locked and/or interlocking manner.

Supply device (101), wherein the lifting base plate (210) has vertically extending guide bolts (219), and the plate support (220) includes openings (226), the guide bolts (219) being arranged within the openings (226).

Supply device (101), wherein, in a lifting position of the lifting device (190, 210) the receiving areas (310) are separated with regard to a projection (155) of the receiving device (150) by a vertical positioning spacing ($h_1$), the positioning spacing ($h_1$) corresponding to between 15% to 85% of the height (W) of a workpiece.

Loading system (10) comprising a separation device (100) and a supply device (101).

The exemplary embodiments explained above are embodiments of the invention. In the exemplary embodiments, the described components of the embodiments each represent individual features of the invention that should be considered independently of one another and which also further develop the invention independently of one another and can thus also be considered individually or in a way that differs from the indicated combination as a component of the invention. Furthermore, the described embodiments should also be supplemented by further features of the already described features of the invention.

Further features and designs of the invention will be apparent to a person skilled in the art within the scope of the present disclosure and the claims.

LIST OF REFERENCE SIGNS 1 workpiece
10 loading system
100 separation device
101 supply device
107 screw element
108 support ring
109 detent lug
110 workpiece storage
111 support device
112 swivel pin
113 fork guide
114 spring unit
115 receiving area
116 supply area
117 slot
118 connector
119 outlet device
120 second separation disk
121 second separation chamber
122 bore
123 fastening element
124 perforated disk
125 notch
130 first separation disk
131 first separation chamber
132 handle
133 slot opening
134 bore
135 spring
140 supply disk
141 workpiece guide
142 guide chamfer
143 fixing sleeve
144 clamping lug
145 fixing
150 receiving device
151 fixing element
152 clamping rib
153 cutout
154 recess
155 projection
159 bolt
160 unloading device
161 slot
162 unloading path
170 supports
178 stop element
179 latching element
180 base plate/guide device
181 guide rails/guide device
185 stop plate
186 sliding part
187 guide groove
188 first crossbar
189 second crossbar
190 wedge-type slide/lifting device
191 trowel extension
192 tooth
193 stop plate
194 adjusting screw
195 grip
196 profile guide
198 fixing element
200 lifting slide
201 side opening
205 cutout
206 head
207 profile guide
208 shaft
209 slot opening
210 lifting base plate/lifting device
211 pin
212 spring
213 bolt
214 half-ring
215 fixing element
216 fixing element
217 rail
219 guide bolt
220 plate holder
221 adjusting element
222 centering devices
223 centering element
226 opening
230 guide
231 ceiling surface
300 workpiece carrier
301 holder
302 base plate
310 receiving area
$h_1$ positioning spacing
R1 direction
R2 direction
W workpiece height
X longitudinal direction
Y width direction

The invention claimed is:

1. Separation device for supplying and separating workpieces, comprising:
a workpiece storage;
a first separation disk having first separation chambers;
a supply disk with workpiece guides;
wherein the first separation disk is arranged between a receiving position and a supply position so as to be adjustable with regard to the supply disk;
wherein the first separation chambers are arranged, in the supply position, in alignment with the workpiece guides; and
wherein the first separation chambers are designed to supply workpieces arranged in the first separation chambers to the respective workpiece guides; and
a second separation disk with second separation chambers, which, in the receiving position of the first separation disk, are designed and arranged in alignment with the first separation chambers.

2. The Separation device according to claim 1, wherein the separation chambers and workpiece guides are arranged annularly and coaxially about a swivel pin.

3. The Separation device according to claim 2, wherein the workpiece storage is funnel-shaped.

4. The Separation device according to claim 3, wherein the workpiece storage is radially adjustable to the swivel pin against a spring force from its distribution position to its unloading position.

5. The Separation device according to claim 4, wherein a spring has a first end portion which is arranged on the workpiece storage, and wherein the spring has a second end portion which is arranged on a fork guide, which is rotatably mounted on the swivel pin.

6. The Separation device according to claim 2, wherein the workpiece storage comprises a receiving area for receiving workpieces, the receiving area merging into a supply device opening in the area of the separation chambers, and the supply area is designed as an arcuately extending slot embracing a plurality of separation chambers.

7. The Separation device according to claim 6, wherein the workpiece storage is adjustable between a distribution position and an unloading position;
- wherein the workpiece storage is rotatable, in its distribution position, about the swivel pin, and is arranged, with its supply area in the area of the separation chambers; and
- wherein the workpiece storage runs, in its unloading position, with its supply region radially outside the separation disk and the supply disk so that workpieces are conveyable out of the workpiece storage through the supply region.

8. The Separation device according to claim 1, wherein the first separation disk is adjustable out of the receiving position in a circumferential direction against a restoring force to the supply position.

9. The Separation device according to claim 1, wherein the first separation disk is arranged between the second separation disk and the supply disk.

10. The Separation device according to claim 1, wherein the workpiece guides each have a muzzle area with a guide chamfer.

11. The Separation device according to claim 1, wherein at least one handle is arranged on the first separation disk, and wherein the handle has a slot opening.

12. The Separation device according to claim 11, wherein a fixing element is arranged inside the slot opening.

13. A Loading system having a separation device according to claim 1 and a supply device for supplying a workpiece carrier having at least one receiving area for receiving separately positioned workpieces, wherein the supply device comprises:
- a guide device;
- a workpiece carrier with the at least one receiving area; and
- a lifting slide for positioning the at least one receiving area, wherein the lifting slide has:
  - a plate support for receiving a workpiece carrier; and
  - a lifting device designed to vertically lift the plate support;
  - wherein the lifting device is designed to adjust a vertical spacing between the plate support and the receiving device, and
- wherein the guide device is designed to shift the plate support in a plane parallel to the receiving device.

14. The Loading system according to claim 13, wherein the supply device also comprises a receiving device for receiving the separation device.

* * * * *